Dec. 9, 1958     W. H. BARKAS ET AL     2,864,056
REMOTE IMPEDANCE INDICATORS
Filed Feb. 11, 1953
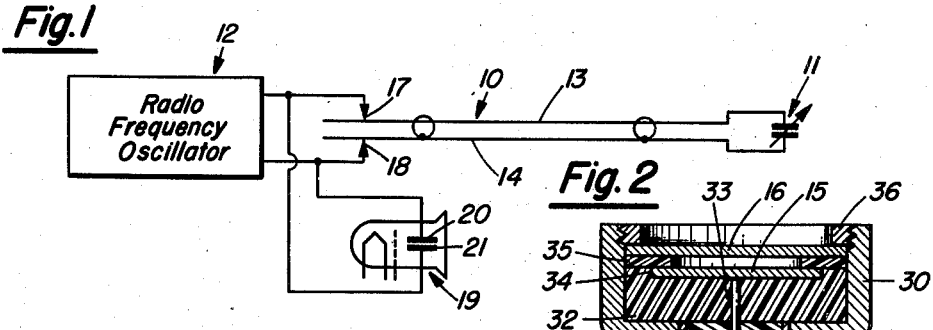
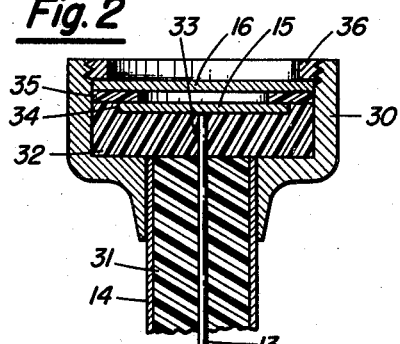
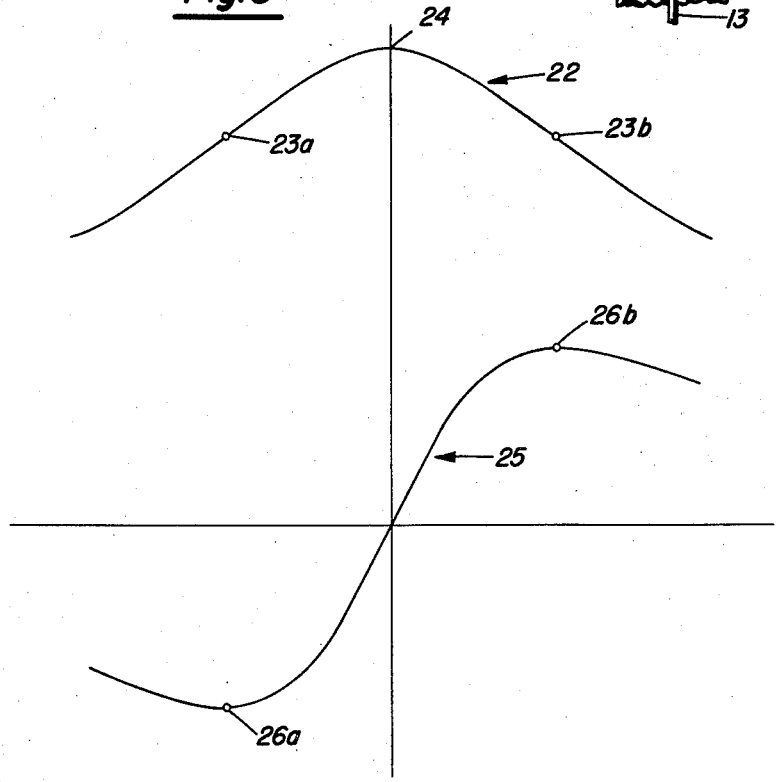
INVENTOR.
Walter H. Barkas
Alfred B. C. Anderson
BY
Paul M. Klein Jr.
Attorneys

2,864,056

REMOTE IMPEDANCE INDICATORS

Walter H. Barkas, Oakland, and Alfred B. C.
Anderson, China Lake, Calif.

Application February 11, 1953, Serial No. 336,458

1 Claim. (Cl. 324—57)

(Granted under Title 35, U. S. Code (1952), sec. 266)

The invention described herein may be manufactured and used by or for the Government of the United States of America for governmental purposes without the payment of any royalties thereon or therefor.

The present invention relates to remote impedance indicators and, more particularly, to an arrangement for effecting between physically remote points a translation of minute impedance variations into relatively large and readily measurable variations in voltage.

The impedance indicator of the present invention has particular utility under circumstances where the impedance is in a dangerous or otherwise inaccessible position. An exemplary circumstance would be provided when it is desired to measure the variation of a pressure-sensitive impedance disposed in the immediate vicinity of an explosion. In some fashion, the data provided by the impedance variation resulting from the explosion must be made available at a position sufficiently remote from the explosion as not to endanger a recording mechanism or any interested personnel.

In accordance with the present invention, a transmission line is employed to transfer the impedance data the requisite distance. Generally speaking, attempts to translate the variation of impedance into a measurable voltage variation at a relatively remote point by the use of coaxial cables or other transmission lines have been considered impractical. Because of the attenuation in the line, the length of line which might be utilized and yet provide a measurable voltage variation was seemingly very limited. In other words, if a long transmission line were employed, the arrangement would be relatively insensitive in its measuring function and therefore of little or no utility. Furthermore, the addition of one or more voltage amplifiers in an effort to offset the line losses would introduce an increase number of circuit components which, in turn, would provide further sources of error to detract from the accuracy of the measurement.

Accordingly, it is an object of the present invention to provide a remote impedance indicator including a transmission line arranged so that the resonance properties of the line itself are utilized to enable translation of impedance variations into voltage variations with a high degree of accuracy and sensitivity.

Other objects and many of the attendant advantages of this invention will be readily appreciated as the same becomes better understood by reference to the following detailed description when considered in connection with the accompanying drawings of a particular embodiment of the invention wherein:

Fig. 1 is a block diagram of a circuit arranged to provide for the remote measurement of pressure and embodying the present invention.

Fig. 2 is a central sectional view of the structural connection of a capacitor at the end of a coaxial cable, the arrangement being preferred in the circuit for the measurement of pressure, as illustrated in Fig. 1.

Fig. 3 is a graphical illustration of the operational characteristics of the circuit of Fig. 1.

Essentially the remote impedance indicator comprises a transmission line 10 arranged for connection at one end to an impedance 11 which is subject to variation and at or adjacent to its other end to a source 12 of alternating current of a frequency near a resonance of the circuit consisting of the line 10 and the variable impedance 11 connected thereto. The present invention involves the recognition of the fact that this circuit can be operated in the vicinity of a certain point near resonance such that the sending impedance of the line (the impedance as seen from the current source 12) is highly sensitive to minute variations or modulations of the variable or terminating impedance 11 and, furthermore, varies rapidly and linearly therewith.

In the particular embodiment of the invention shown in the drawings which is adapted for the remote measurement of pressure, the transmission line 10 is preferably a coaxial cable, the interior and exterior conductors 13 and 14 of which are connected respectively to the plates 15, 16 of a capacitor which forms the terminating impedance 11 and is constructed in a particular fashion to be hereinafter described so as to respond accurately to variations of pressure in its immediate vicinity. The source of current 12 preferably comprises a radio-frequency oscillator designed to supply current of constant amplitude and of high frequency to the coaxial cable 10 through adjustable contacts 17, 18, and should preferably have, in addition, an internal impedance matching the characteristic impedance of the cable. The circuit can be arranged to operate at the desired point near resonance either by adjustment of the oscillator frequency or adjustment of the length of the line through manual shifting of the contacts 17, 18 on the respective conductors 13, 14 of the coaxial cable. The voltage developed across the sending impedance during operation can be indicated on an oscilloscope 19 whose vertical deflecting anodes 20, 21 are connected to the described contacts 17, 18, as shown. Although not illustrated, it is contemplated and considered within the scope of the invention to introduce a bridge circuit with the sending impedance of the described circuit connected as one arm of the bridge. In this manner, voltage would be indicated on the oscilloscope only when a variation in capacitance from an established norm occurred.

The general equation defining the sending impedance of a transmission line terminated by a variable impedance is as follows:

$$Z_s = Z_o \left[ \frac{Z_L + Z_o \tanh (\alpha + j\beta)l}{Z_o + Z_L \tanh (\alpha + j\beta)l} \right]$$

where $Z_s$ is the sending impedance of the circuit,
$Z_o$ is the characteristic impedance of the transmission line,
$Z_L$ is the terminating impedance,
$\alpha$ is the attenuation constant of the line,
$\beta$ is the phase constant of the line,
$j$ is the quadrature operator, and
$l$ is the length of the transmission line.

Utilizing this equation, it has been determined by analysis of the particular characteristics of the described circuit comprising the cable 10 terminated by the variable capacitor 11 that the operating point in the vicinity of which the sending impedance of the line (and thus the voltage developed thereacross by the flow of constant amplitude current) varies in a linear and highly sensitive fashion with variations of the terminating capacitance occurs where the sending impedance is substantially in the ratio of $\sqrt{2/3}$ to the maximum sending impedance (the resonant peak) of the circuit, if the cable attenuation is assumed to be relatively small.

A curve 22 representing the variation of sending impedance with variation of the capacitance in the vicinity of an $n$th resonance of the circuit is shown in Fig. 3 with the determined operating point indicated at 23a. A second operating point 23b is symmetrically disposed on the other side of the resonant peak 24 where the impedance attains its maximum value.

Since in the vicinity of either of the operating points 23a, 23b, the curve 22 follows substantially a straight line, the linear relation between the capacitance and sending impedance variation is readily observable. Additionally, it may be observed that the slope of the curve 22, representative of the derivative of the sending impedance with respect to the capacitance and accordingly of the sensitivity of the circuit, is a maximum at each of said operating points. This fact may be more readily seen with reference to the curve 25 in Fig. 3, which represents the sensitivity value plotted against the terminating capacitance with the operating points indicated at 26a and 26b.

Similar resonance and sensitivity curves result from a variation in the operating frequency or the length of line employed. As a consequence, if the circuit comprising the transmission line 10 terminated by the variable capacitor 11 is arranged to operate at one of the designated operating points near resonance, the sending impedance will vary in a linear and highly sensitive fashion with small changes in the capacitance and furthermore the sensitivity will remain substantially constant regardless of small changes in the length of the line due to temperature variation or of small changes in the frequency resulting from inherent instability of the oscillator. Inaccuracies which have resulted in other circuits from such instability of environmental conditions and inherent circuit characteristics can therefore be avoided.

The present circuit arrangement is prepared for operation first either by adjusting the length of the transmission line 10 by moving the described contacts 17, 18 or by adjusting the frequency of the oscillator 12 so that one of the designated operating points where the ratio of the sending impedance to the maximum sending impedance is $\sqrt{2/3}$, is established. Then the capacitor 11 is positioned, for example, in the vicinity of an explosion which is about to occur and the coaxial cable 11 laid so that the oscillator 12 and oscilloscope 19 connected adjacent its opposite end can be placed where they will be free from any damaging effects of the explosion. The oscillator 12 is energized to supply current of constant amplitude and frequency to the circuit and as long as the pressure on the capacitor 11 remains constant, a constant voltage will be developed across the sending impedance and will be visible on the oscilloscope screen.

When the explosion occurs, the capacitance will change to cause a linear and greatly amplified change in the sending impedance so that the voltage as visible at the oscilloscope will vary in amplitude a corresponding amount.

In order that the capacitive variation in response to contemplated maximum pressure changes will not cause the circuit to deviate too far from the established operating point and thus introduce non-linearity to the measurement, the capacitor is constructed to have a relatively small range of variation. The measurement is not adversely affected by the limitation on the total possible variation of the capacitance value because of the high sensitivity of the circuit arrangement (i. e. a small change of capacitance will produce a large change in sending impedance and the voltage developed thereacross because the circuit operates near resonance). Furthermore, because the high sensitivity does provide, in effect, sizeable amplification in the translation of the capacitance or terminating impedance value into the voltage across the sending impedance, the necessity for additional amplifying circuits is obviated in most cases to lessen errors in measurement which all amplifying circuits tend to introduce, as previously mentioned.

A preferred form of capacitor 11 which can be advantageously used to detect variations in pressure in accordance with the present invention and more particularly in accordance with the above-stated desiderata is shown in Fig. 2. An annular cup-shaped metallic member 30 is telescoped over the end of the coaxial cable 10 and mechanically and electrically secured to the exterior conductor 14 of the cable, which conductor as well as the cable insulation 31 is cut back to leave a small terminal length of the inner conductor 13 exposed. A cylindrical plug 32 formed of insulating material and having a small axial hole 33 is inserted to abut the bottom of the annular cup 30 and receive the inner cable conductor 13 in its axial hole. One plate 15 of the capacitor, comprising a circular metal disc, is seated in a recess 34 in the outer surface of the plug 32 to remain stationary and is soldered to the end of the inner cable conductor 13. The other and movable plate 16 of the capacitor comprises a somewhat larger disc having a diameter closely matching the interior diameter of the metallic cup 30 and is inserted into the cup with its annular portion resting upon a flat insulating ring 35 which in turn rests upon adjacent portions of the stationary plate 15 and the supporting plug 32. To hold the parts in the described assembly and also make electrical connection between the metallic cup 30 and the movable plate 16, an exteriorly threaded nut 36 is screwed into an interiorly threaded portion of the cup 30 adjacent its upper lip. The thickness of the insulating ring 35 determines the normal spacing between the plates 15, 16 of the capacitor, as will be apparent, and the substantial transverse dimension of the ring limits the deformation of the movable plate 15 in response to a given pressure increase so that the change of capacitance relative to pressure variation is kept small as desired in accordance with the present invention. Additionally, the ring 35 is constructed of a material which has not only good insulating quality but also a low coefficient of thermal expansion so that temperature variations will not produce any notable change in the capacitance. Furthermore, the material for the construction of the ring is preferably such that no deformation will occur with repeated exposure to high pressures. Either mica or fused quartz have been found to meet admirably the described requirements. Thus, with the construction shown in Fig. 2, the possibility of introducing error into the measurement of pressure is reduced to a minimum.

The coaxial cable 10 preferably has low attenuation and a high characteristic impedance, substantially resistive in character. However, these characteristics of the cable only affect the sensitivity of the impedance measuring arrangement and not the accuracy of the measurement. Commercially available cables of good quality are well suited for use in the present device and permit the successful recording of pressure data at distances of 200 feet and upwards.

It will be understood that the foregoing analysis of a capacity-terminated transmission line used for the measurement of pressure is but one embodiment of the invention and that the terminating impedance can as well be an inductor arranged to operate near an operating point as hereinbefore determined to enable a linear and highly sensitive variation in the sending impedance of the circuit when the inductance is modulated in any fashion. Moreover, the transmission line may be terminated by a resistor arranged for modulation about operating points which may be similarly determined such that a linear and sensitive variation of the sending impedance will result from such modulation. In each instance, it will be recognized that the resonance properties of the transmission line are utilized, in accordance with the present invention, to, in effect, provide considerable amplification in the translation of the terminating impedance variation into the voltage variation at the sending end of the transmission line. Other modifications and variations of the present invention are obviously possible in the light of the above teachings. It is therefore to be understood that within the scope of the appended claim the invention may be practiced otherwise than as specifically described.

What is claimed is:

An arrangement for indicating impedance variations comprising a transmission line adapted for termination at one end by the impedance whose variation is to be indicated, and means for supplying alternating current of substantially constant frequency to said transmission line at a position thereon such that said line when terminated by the impedance operates at a point near resonance where the sending impedance of the line varies linearly and in a highly sensitive manner with variations in the impedance terminating said line, said operating point being defined as that point where the sending impedance is substantially in the ratio of $\sqrt{2/3}$ to the maximum sending impedance of said transmission line when terminated by the variable impedance.

References Cited in the file of this patent

UNITED STATES PATENTS

| | | |
|---|---|---|
| 2,079,894 | Bechmann et al. | May 11, 1937 |
| 2,519,668 | Konigsberg | Aug. 22, 1950 |
| 2,522,574 | Hagenbuch | Sept. 19, 1950 |
| 2,547,780 | Reynst | Apr. 3, 1951 |
| 2,571,507 | Welch | Oct. 16, 1951 |
| 2,615,960 | Erwin | Oct. 28, 1952 |
| 2,627,539 | Tompkins | Feb. 3, 1953 |